US011819970B2

(12) United States Patent
Bernier et al.

(10) Patent No.: US 11,819,970 B2
(45) Date of Patent: Nov. 21, 2023

(54) KNURLING EDGE DRIVING TOOL

(71) Applicant: Lam Research Corporation, Fremont, CA (US)

(72) Inventors: Terrence George Bernier, Hillsboro, OR (US); Timothy Scott Thomas, Wilsonville, OR (US); Allan Jones, Hillsboro, OR (US); Jeffrey Simpson, Vancouver, WA (US)

(73) Assignee: Lam Research Corporation, Fremont, CA (US)

( * ) Notice: Subject to any disclaimer, the term of this patent is extended or adjusted under 35 U.S.C. 154(b) by 454 days.

(21) Appl. No.: 15/837,707

(22) Filed: Dec. 11, 2017

(65) Prior Publication Data

US 2019/0176280 A1     Jun. 13, 2019

(51) Int. Cl.
| | | |
|---|---|---|
| *B25B 13/06* | (2006.01) | |
| *B25B 13/50* | (2006.01) | |
| *B23Q 5/04* | (2006.01) | |
| *F16D 1/116* | (2006.01) | |

(52) U.S. Cl.
CPC ............... *B23Q 5/04* (2013.01); *B25B 13/06* (2013.01); *B25B 13/5016* (2013.01); *F16D 1/116* (2013.01); *F16D 2300/10* (2013.01)

(58) Field of Classification Search
CPC ....... B23Q 5/04; F16D 1/116; F16D 2300/10; E21B 19/16; B25B 13/48; B25B 13/481
USPC .............................................. 81/124.4, 124.2
See application file for complete search history.

(56) References Cited

U.S. PATENT DOCUMENTS

| | | | | |
|---|---|---|---|---|
| 1,321,776 A | * | 11/1919 | Stepanian ............... | B25B 13/48 |
| | | | | 81/120 |
| 1,336,794 A | * | 4/1920 | Stepanian ........... | B25B 27/0057 |
| | | | | 81/120 |
| 2,825,250 A | * | 3/1958 | Bennett .................... | B23B 27/24 |
| | | | | 279/114 |
| 3,590,235 A | * | 6/1971 | Leo ........................ | B60T 17/221 |
| | | | | 81/124.2 |
| 3,957,096 A | * | 5/1976 | Rodman ................. | B25B 15/02 |
| | | | | 81/177.1 |
| 4,346,633 A | * | 8/1982 | Rendl .................... | B25B 23/141 |
| | | | | 464/43 |
| 4,905,548 A | * | 3/1990 | Colace .................. | B25B 13/481 |
| | | | | 81/177.2 |
| 4,964,319 A | * | 10/1990 | Chang ................... | B25B 13/466 |
| | | | | 81/121.1 |
| 5,048,379 A | * | 9/1991 | Gramera ................. | B25B 13/06 |
| | | | | 81/121.1 |

(Continued)

OTHER PUBLICATIONS

International Search Report from International Application No. PCT/US2018/062546 dated Mar. 13, 2019.
Written Opinion from International Application No. PCT/US2018/062546 dated Mar. 13, 2019.

*Primary Examiner* — Bryan R Muller
(74) *Attorney, Agent, or Firm* — Beyer Law Group LLP

(57) ABSTRACT

A tool for driving a component with a knurling pattern around an outer surface of the component is provided. A shaft, with a first end, is in the form of at least a partial cylinder, where the at least partial cylinder has a first inner diameter that is less than an outer diameter of the knurling pattern. Serrations in the shaft have a pattern that matches the knurling pattern, which allow the serration in the shaft to engage with the knurling pattern so that when the shaft is rotated, the component is rotated.

8 Claims, 5 Drawing Sheets

(56) References Cited

U.S. PATENT DOCUMENTS

| | | | | |
|---|---|---|---|---|
| 5,192,219 | A * | 3/1993 | Fowler | H01R 13/622 |
| | | | | 285/92 |
| 5,361,657 | A * | 11/1994 | Terry | B25B 27/0057 |
| | | | | 81/186 |
| 5,388,479 | A * | 2/1995 | Sroka | B25B 13/107 |
| | | | | 81/58.2 |
| 5,435,760 | A * | 7/1995 | Miklos | H01R 13/516 |
| | | | | 285/92 |
| 5,737,982 | A * | 4/1998 | Lin | B25B 13/466 |
| | | | | 192/43 |
| 5,974,916 | A * | 11/1999 | Lassiter | B25B 27/0057 |
| | | | | 81/60 |
| 6,253,645 | B1 * | 7/2001 | Lin | B25B 13/466 |
| | | | | 81/177.8 |
| 6,314,841 | B1 * | 11/2001 | Burk | B25B 13/06 |
| | | | | 81/124.2 |
| 6,379,076 | B1 | 4/2002 | Reinhold et al. | |
| 6,729,208 | B1 * | 5/2004 | Chrzanowski | B25B 27/18 |
| | | | | 81/53.2 |
| 7,069,820 | B2 * | 7/2006 | Goacher, Sr. | B25B 13/5091 |
| | | | | 81/124.2 |
| 8,678,443 | B2 * | 3/2014 | Bonhag | B25B 27/10 |
| | | | | 285/239 |
| 2008/0011128 | A1 * | 1/2008 | Stephens | B25B 23/12 |
| | | | | 81/124.2 |
| 2010/0064859 | A1 * | 3/2010 | Stephens | B25B 13/065 |
| | | | | 81/125 |
| 2012/0011908 | A1 | 1/2012 | Agbay | |
| 2013/0192039 | A1 * | 8/2013 | Trusty | G01S 7/521 |
| | | | | 81/124.2 |
| 2015/0267730 | A1 | 9/2015 | He | |
| 2017/0021478 | A1 | 1/2017 | Junkers et al. | |

\* cited by examiner

KNURLING EDGE DRIVING TOOL

BACKGROUND

The present disclosure relates to a tool for rotating components with knurling.

Knurling is a patterning placed on an outer diameter of a component to allow fingers to grip the component. Various off the shelf components are made with knurling on an outer diameter, where the component is mounted or removed by turning the component.

SUMMARY

To achieve the foregoing and in accordance with the purpose of the present disclosure, a tool for driving a component with a knurling pattern around an outer surface of the component is provided. A shaft, with a first end, is in the form of at least a partial cylinder, where the at least partial cylinder has a first inner diameter that is less than an outer diameter of the knurling pattern. Serrations in the shaft have a pattern that matches the knurling pattern, which allow the serration in the shaft to engage with the knurling pattern so that when the shaft is rotated, the component is rotated.

These and other features of the present disclosure will be described in more detail below in the detailed description of the disclosure and in conjunction with the following figures.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE PREFERRED EMBODIMENTS

The present disclosure will now be described in detail with reference to a few preferred embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

A component with a knurling pattern is typically a cylindrical component with knurling around an outer surface around an outer circumference of the component. A couple of common knurling patterns may be a linear knurl or diamond knurl. A linear knurl may provide lines or ridges that extend parallel to a central axis of the cylindrical component. A diamond knurl would be formed by two sets of parallel lines that are angled with respect to each other to form a criss-cross pattern. One of the purposes of knurling is to make the component easier to grasp by hand to twist around the central axis of the cylinder. The knurling also makes it easier to grasp by the use of pliers for rotation around the central axis of the cylinder.

Many off the shelf items come with knurling. A difficulty occurs if an off the shelf component with a knurling pattern is placed in a small space that does not allow room for fingers to grasp the knurling pattern. In such cases, pliers may be used to reach smaller spaces. However, pliers may not work if the spaces are too small. In addition, pliers may damage items surrounding the component with the knurling pattern.

Figure 1A:
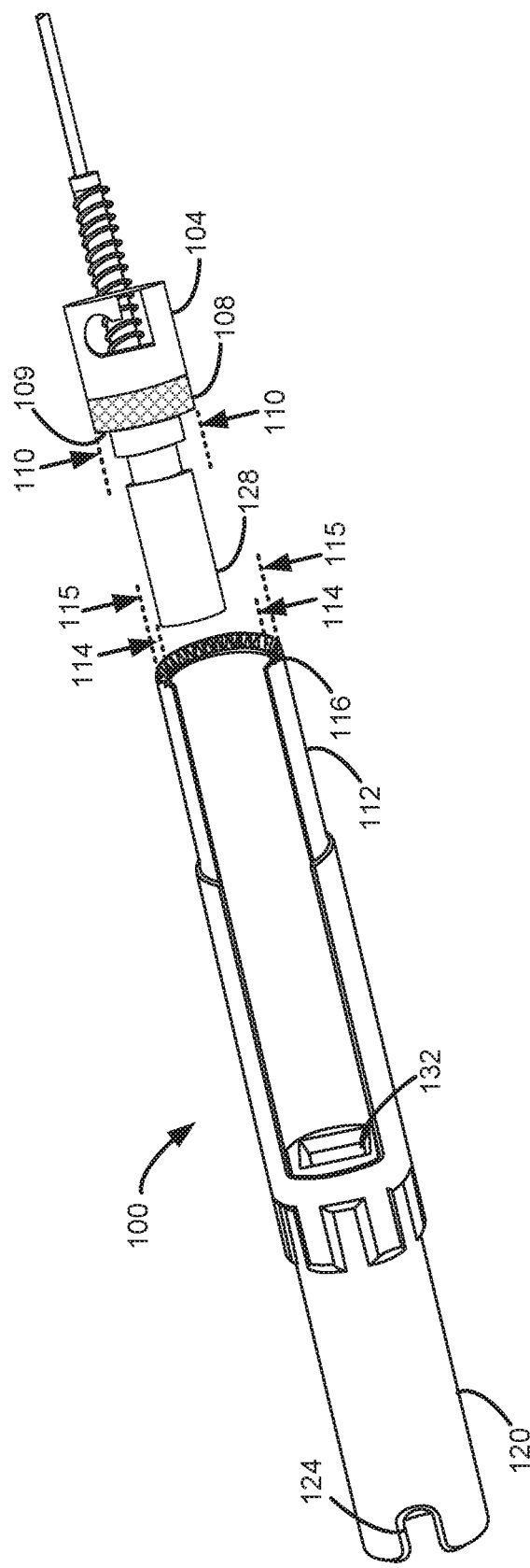
FIGS. 1A and 1B are schematic perspective views of a tool used in an embodiment and a component with a knurling pattern.
Figure 1B:
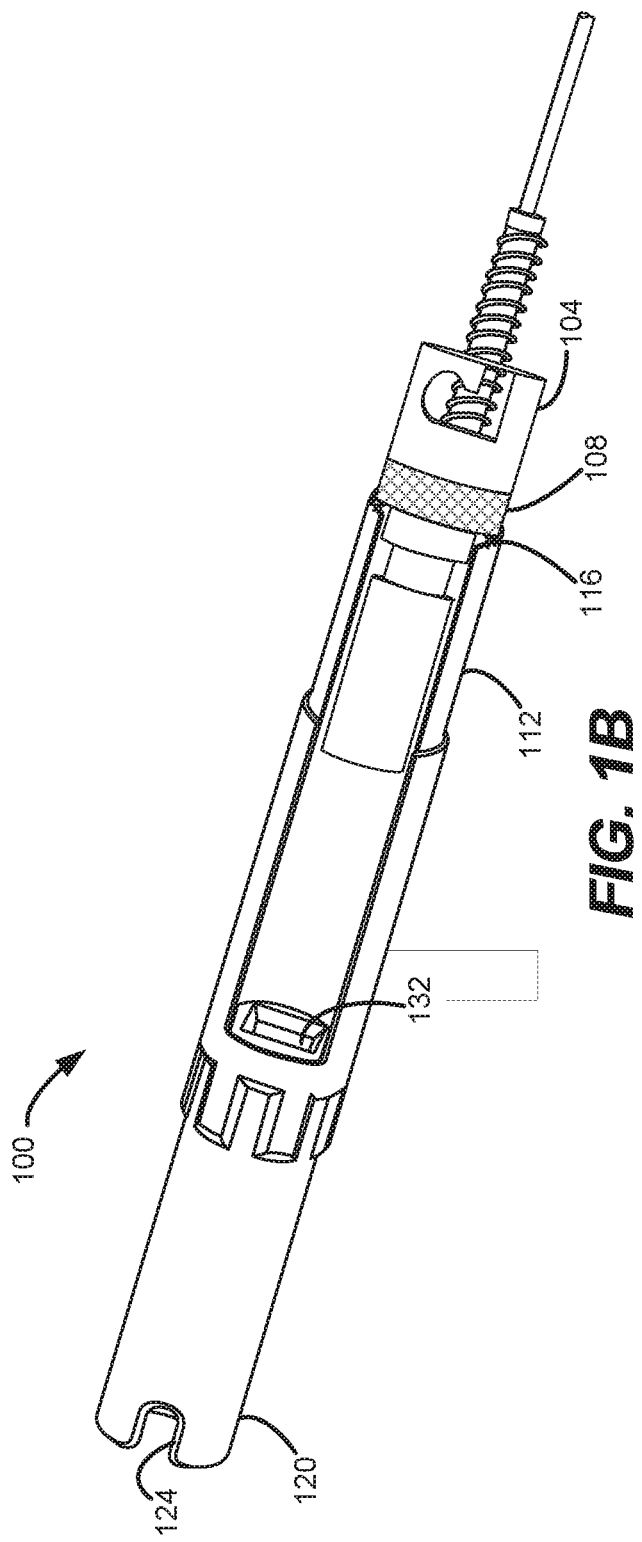

To facilitate understanding, FIG. 1A is schematic perspective view of a tool 100 used in an embodiment and a component 104 with a knurling pattern 108 at a first end. The tool 100 has a shaft 112 with a first end. The shaft 112 forms a partial cylinder, in that the shaft is a cylinder shape with one side cut away. The shaft 112 has serrations 116 at a first end of the shaft 112. The serrations 116 match the knurling pattern 108, in that bumps in the serration 116 match dips in the knurling pattern 108 and dips in the serration 116 match bumps in the knurling pattern 108. FIG. 1B is a schematic perspective view of the tool engaged with the component 104. Bumps in the serration 116 are placed into dips in the knurling pattern 108. The engagement of the serration 116 with the knurling pattern 108 causes the component 104 to turn when the tool 100 is rotated around an axis of rotation at a central axis of the at least partial cylinder forming the shaft 112. The at least partial cylinder forming the shaft 112 has an inner diameter 114 that is less than the outer diameter 110 of the knurling pattern 108. If the shaft 112 did not have an inner diameter 114 that was less than the outer diameter 110 of the knurling pattern 108, then the serration 116 would not engage with the knurling pattern 108. In this embodiment, the serration 116 is beveled, so that at the first end of the shaft 112, the inner diameter 115 is slightly larger than the outer diameter 110 of the knurling pattern 108 and at an end of the serration 116 away from the first end the shaft has an inner diameter 114 that is less than the outer diameter 110 of the knurling pattern 108. The bevel providing an inner diameter 115 that is greater than the outer diameter 110 of the knurling pattern 108 and an inner diameter 114 less than the outer diameter 110 of the knurling pattern 108 allows the tool 100 to drive components with knurling patterns of different outer diameters, providing a tolerance for different outer diameters of knurling patterns.

The forming the shaft from a partial cylinder allows the shaft to expand to provide a gripping force towards the center of the shaft and around the knurling pattern. In addition, a partial cylinder provides an opening to accommodate parts attached to the component 104 that may extend through an opening in the cylinder. Other embodiments may use other methods to provide additional gripping force, such as making the tool of an elastic material. If the inner diameter of the first end of the shaft is less than or only slightly larger than the outer diameter of the knurling pattern, the tool engages the end of the knurling pattern. In such an embodiment, since the tool has an inner diameter at the first end that is less than or only slightly larger than the outer diameter of the knurling pattern, the diameter of the tool allows for driving the component in tight spaces that have a diameter only slightly larger than the outer diameter of the knurling pattern. In this embodiment, the knurling pattern 108 is at the end of the component 104 so that the shaft has an inner diameter that is less than the first end of the component 104 and so that the serrations 116 engage with the edge 109 at the first end of the component 104 and the end of the knurling pattern.

Figure 2:
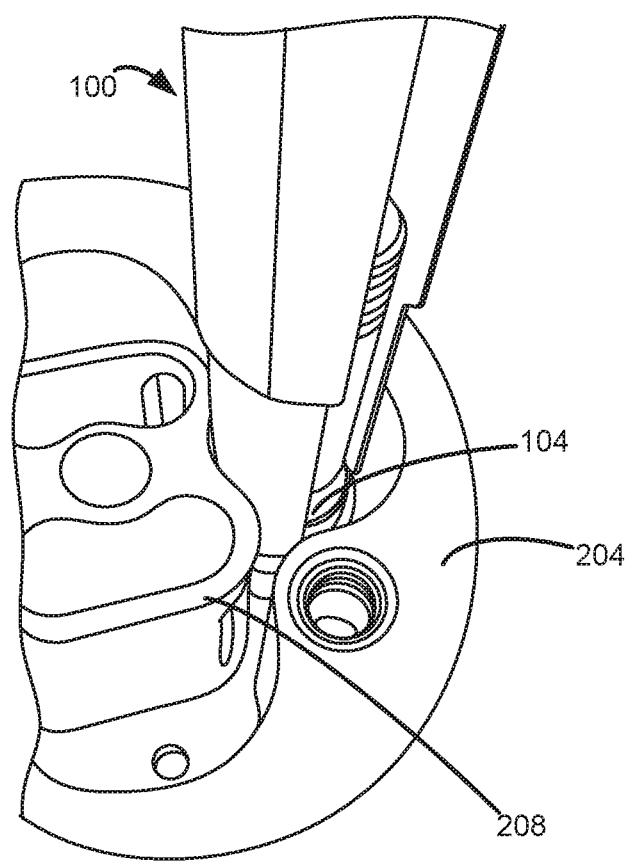
FIG. 2 is a schematic perspective view of the tool being used to drive a component with a knurling pattern in a tight space.

FIG. 2 is a perspective view of the tool 100 being used to drive a component 104 with a knurling pattern in a tight space. In this example, the component is mounted in a pedestal 204 of an electrostatic chuck (ESC) for use in a plasma processing chamber. A ceramic wire separator 208 is adjacent to the component 104. Using a tool, such as pliers, to grab the outside of the component 104 may cause the tool to rub against the ceramic wire separator 208, which could damage the ceramic wire separator 208.

Figure 3:
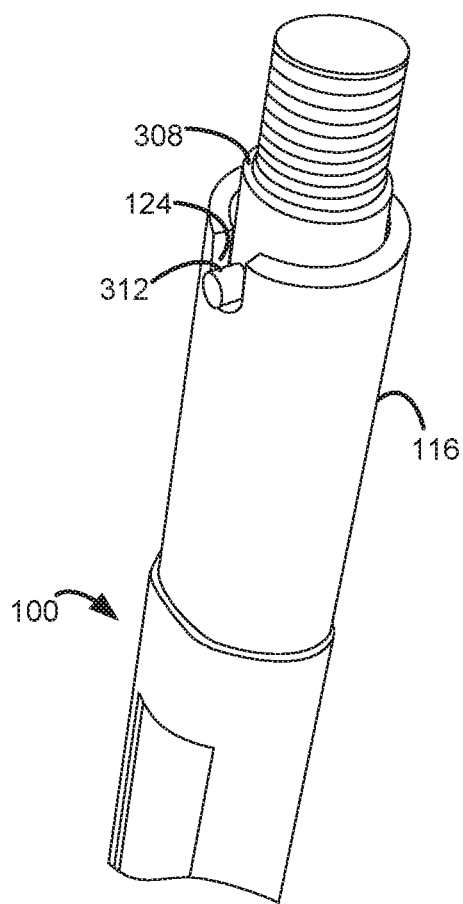
FIG. 3 is a schematic view of a second end of the tool engaging a threaded bayonet component.

FIG. 3 is a schematic view of a second end 120 of the tool 100 engaging a threaded bayonet component 308, which may be screwed into the pedestal. In this embodiment, a second end 120 of the tool 100 has a notch 124 and has a cylinder shape with an inner diameter that is greater than the outer diameter of the threaded bayonet component 308. In order to engage the bayonet pin 312 of the threaded bayonet component 308, the inner diameter of the cylinder shape must be less than the sum of the outer diameter of the threaded bayonet component 308 plus the length of the bayonet pin 312. The notch 124 on the second end 120 of the tool 100 engages the threaded bayonet component 308 to rotate the threaded bayonet component 308 to either mount or dismount the threaded bayonet component 308 into a threaded aperture in the pedestal. In this example, the threaded bayonet component 308 and the component 104 with the knurling pattern 108 are used to mount a thermal couple 128 in the pedestal. In this embodiment, the component 104 with the knurling pattern has a notch, which is able to engage with the bayonet pin 312 in order to mount the thermal couple 128. The embodiment allows providing both pressure to compress the component 104 with the knurling 108 towards the threaded bayonet component 308 and rotation of the component with knurling, which is required to engage the component 104 with the threaded bayonet component 308.

In this embodiment, a square notch 132 is placed along the central axis of the shaft. The dimensions of the square notch and inner diameter of the shaft allow an extension for a socket wrench to fit into the notch and inner diameter of the shaft. A socket wrench or torque wrench may be connected to the extension to rotate the tool and also to possibly place a measured torque on the component. For example, the threaded bayonet component 308 may require a specific torque to sufficiently tighten the threaded bayonet component 308 without damaging the pedestal 204. The ability to drive the tool with a torque wrench allows the required torque to be applied.

Figure 4:
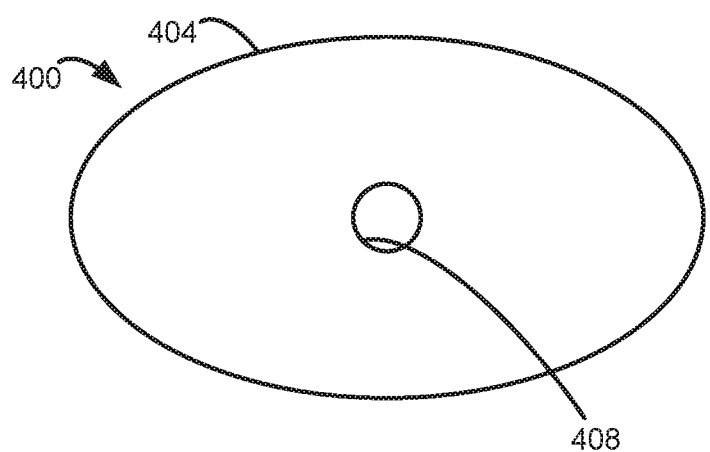
FIG. 4 is a schematic end view of a handle of a tool in another embodiment.

FIG. 4 is a schematic end view of a handle 404 of a tool 400 in another embodiment. A hole 408 in the handle 404 forms a hole in the shaft. The handle 404 in this embodiment is elliptical, providing two bumps to allow the handle to be easily grasped and turned by hand.

In other embodiments, a slot may be provided along the axis of rotation of the shaft in order for the shaft to be rotated using a standard screw driver. In other embodiments, two slots forming a cross may be provided along the axis of rotation of the shaft in order for the shaft to be rotated using a Phillips screw driver. Other notch or bump configurations may be used to accommodate other driver devices to facilitate the rotation of the shaft around the axis of rotation of the shaft.

While this disclosure has been described in terms of several preferred embodiments, there are alterations, permutations, modifications, and various substitute equivalents, which fall within the scope of this disclosure. It should also be noted that there are many alternative ways of implementing the methods and apparatuses of the present disclosure. It is therefore intended that the following appended claims be interpreted as including all such alterations, permutations, and various substitute equivalents as fall within the true spirit and scope of the present disclosure.

What is claimed is:

1. A tool for driving a component with a knurling pattern around an outer surface of the component, comprising
   a shaft, with a first end, wherein the shaft is in the form of a cylinder, wherein the shaft has a first inner diameter, wherein a portion of a side of the shaft is cut away at the first end of the shaft; and
   serrations in the shaft, which allow the serration in the shaft to engage with the knurling pattern of the component so that when the shaft is rotated, the component is rotated, wherein the serrations in the shaft are at the first end of the shaft, wherein the portion of the side of the shaft that is cut away is the only portion of the side of the shaft cut away at the first end and has a length extending from the first end in a direction away from the first end that is longer than a length of all of the serrations in the shaft, and wherein the cut away portion of the shaft does not extend along the entire length of the shaft.

2. The tool, as recited in claim 1, wherein the serrations form a bevel, where a second inner diameter of the shaft at the first end is greater than the first inner diameter of the shaft at an end of the serration away from the first end, wherein the portion of the side of the shaft that is cut away has a length that is longer than a length of the bevel of all of the serrations in the shaft.

3. The tool, as recited in claim 1, further comprising a second end of the shaft, wherein the second end comprises an engagement feature for rotating the shaft.

4. The tool, as recited in claim 3, wherein the engagement features comprise at least one of bumps on an exterior of the second end of the shaft or a non-circular engagement aperture along an axis of rotation of the shaft.

5. The tool, as recited in claim 1, further comprising a slot on a second end of the shaft adapted for engaging a bayonet component.

6. The tool, as recited in claim 3, wherein the engagement features comprise a non-circular engagement aperture along an axis of rotation of the shaft and wherein the cut away portion extends along the shaft so that an end of the cut away portion is a same distance from first end as a distance of the non-circular engagement aperture is from the first end.

7. The tool, as recited in claim 6, wherein the first diameter of the shaft is constant from the serrations in the shaft to the non-circular engagement aperture.

8. A tool for driving a component with a knurling pattern, comprising:
   a cylindrical shaft comprising a first end, a serration at the first end, and a cut away extending from the first end and partially along a side of the shaft,
   wherein a length of the cut away is longer than a length of the serration at the first end and shorter than a length of the shaft,
   wherein the cut away is the only portion of the side of the shaft that is cut away at the first end, and
   wherein the serration is configured to engage with a knurling pattern of a component, wherein when the serration engages the knurling pattern of the component, rotation of the shaft rotates the component.

* * * * *